United States Patent
Wolf

(10) Patent No.: US 11,879,721 B2
(45) Date of Patent: Jan. 23, 2024

(54) INTERFEROMETRIC MEASUREMENT METHOD AND INTERFEROMETRIC MEASUREMENT ARRANGEMENT

(71) Applicant: Carl Zeiss SMT GmbH, Oberkochen (DE)

(72) Inventor: Alexander Wolf, Essingen (DE)

(73) Assignee: CARL ZEISS SMT GMBH, Oberkochen (DE)

(*) Notice: Subject to any disclaimer, the term of this patent is extended or adjusted under 35 U.S.C. 154(b) by 17 days.

(21) Appl. No.: 17/701,012

(22) Filed: Mar. 22, 2022

(65) Prior Publication Data
US 2022/0307822 A1 Sep. 29, 2022

(30) Foreign Application Priority Data
Mar. 23, 2021 (DE) .......................... 102021202820.9

(51) Int. Cl.
*G01B 11/24* (2006.01)
*G01B 9/02001* (2022.01)
(Continued)

(52) U.S. Cl.
CPC ...... *G01B 11/2441* (2013.01); *G01B 9/02007* (2013.01); *G01B 9/02028* (2013.01);
(Continued)

(58) Field of Classification Search
CPC ............ G01B 9/02007; G01B 9/02028; G01B 9/02039; G01B 9/02087; G01B 2290/30; G01B 11/2441
See application file for complete search history.

(56) References Cited

U.S. PATENT DOCUMENTS

2015/0198438 A1 7/2015 Hetzler
2018/0106591 A1 4/2018 Hetzler et al.
(Continued)

FOREIGN PATENT DOCUMENTS

DE 102012217800 A1 4/2014
DE 102015209490 A1 11/2016
(Continued)

OTHER PUBLICATIONS

Schuhler et al., "Frequency-comb-referenced two-wavelength source for absolute distance measurement", Optics Letters 31, issue 21, (2006), 3 pages.

*Primary Examiner* — Michael A Lyons
(74) *Attorney, Agent, or Firm* — Edell, Shapiro & Finnan, LLC

(57) ABSTRACT

A measurement method for interferometrically measuring the shape of a surface (112) of a test object (114). A test wave (125-1, 125-2) directed at the test object has a wavefront that is at least partially adapted to the desired shape of the surface, and a reference wave (128-1, 128-2) directed at a reflective optical element (130-1, 130 2) has a propagation direction that deviates from the propagation direction of the test wave (125-1, 125-2) for each of two input waves by diffraction at a diffractive element (124). For each wavelength, the test wave is superimposed after interaction with the test object with the associated reference wave after the back-reflection at the first reflective optical element. The test and reference waves are diffracted again at the diffractive element for superposition. An interferogram produced by the superposition is captured in a capture plane (148-1, 148-2). The interferograms are jointly evaluated.

18 Claims, 4 Drawing Sheets

(51) Int. Cl.
*G01B 9/02* (2022.01)
*G01B 9/02015* (2022.01)

(52) U.S. Cl.
CPC ..... *G01B 9/02039* (2013.01); *G01B 9/02087* (2013.01); *G01B 2290/30* (2013.01)

(56) References Cited

U.S. PATENT DOCUMENTS

2020/0225028 A1 7/2020 Hetzler et al.
2021/0140762 A1* 5/2021 Siegler ............... G01B 9/02011

FOREIGN PATENT DOCUMENTS

DE 102017217369 A1 4/2019
WO WO-2020128423 A1 * 6/2020 ........... G01B 11/162

* cited by examiner

Prior Art  Fig. 1

INTERFEROMETRIC MEASUREMENT METHOD AND INTERFEROMETRIC MEASUREMENT ARRANGEMENT

CROSS REFERENCE TO RELATED APPLICATIONS

This application is based on and claims the benefit of and priority under 35 U.S.C. § 119(a) to German Patent Application DE 10 2021 202 820.9, filed on Mar. 23, 2021; the present application hereby incorporates the German Application, in its entirety, into the present application, by this reference.

FIELD OF THE INVENTION

The invention relates to a measurement method and to a measurement arrangement for interferometrically measuring a shape of a surface of a test object.

BACKGROUND

A preferred area of application is the measurement of the surface shape of mirrors for use in optical systems for EUV microlithography, that is to say for microlithography utilizing extreme ultraviolet (EUV) radiation. Such mirrors frequently have freeform surfaces, that is to say surface shapes that deviate significantly from rotation-symmetric spherical or aspherical surface shapes.

For the highly accurate interferometric measurement of the surface shape of a test object, for instance an optical element for a projection lens of a microlithography projection exposure apparatus, diffractive optical arrangements are often used as what are known as zero optics. In this case, the wavefront of a test wave is adapted by way of a diffractive optical element to a desired shape of the surface such that the test wave would be incident on the desired shape in perpendicular fashion at every location and be reflected back on itself thereby. Deviations from the desired shape can be determined by superposing a reference wave on the reflected test wave. The diffractive optical element used can be a computer-generated hologram (CGH), for example.

DE 10 2015 209 490 A1 (corresponding to US 2018/106591 A1) describes an interferometric measurement method and a measurement arrangement, which enable highly accurate measurements of the surface shape even for large test objects and/or test objects that are warmer compared to the surrounding area by using a complex coded CGH.

The term "complex coded CGH" here generally refers to a CGH that has two or more different structure patterns that have different diffraction properties, implement two or more different functionalities owing to the different diffraction properties, and are superposed on one another in a common plane.

The measurement arrangement of DE 10 2015 209 490 A1 comprises a light source for providing an input wave, a diffractive optical element, which is arranged in the beam path of the input wave and is suitably configured to produce by way of diffraction from the input wave a test wave, which is directed at the test object and has a wavefront adapted at least partially to a desired shape of the optical surface, and also to produce a reference wave, which has a propagation direction that deviates from a propagation direction of the test wave, a reflective optical element, which is arranged in the beam path of the reference wave and is designed for the back-reflection of the reference wave, and a capture device for capturing an interferogram, which is produced by superposition of the test wave after interaction with the test object and the back-reflected reference wave, in each case after another diffraction at the diffractive optical element in a capture plane.

One advantage of using diffractive optical elements in measurement arrangements is that a diffractive optical element can be given further functionalities, if needed, for example for calibration purposes. The purpose of a calibration may be, for example, to enable the determination of production-related geometric optical errors (also referred to as writing errors or placement errors) on the CGH in situ.

DE 10 2017 217 369 A1 describes a measurement arrangement, in which a diffractive optical element has a complex coded phase grating with at least three different phase functions for producing at least one calibration wave. For the production of three calibration waves, a complex coded phase grating having five different phase functions, that is to say a five-times encoded diffractive optical element, is used.

In practice, the advantages of complex coded diffractive optical elements are also countered by disadvantages. The greater the number of different encodings is, the greater is the risk of producing undesirable orders of diffraction so that undesirable reflection paths may arise that impair the measurement accuracy. Calibration measurements are time-consuming and require additional components in the measurement arrangement, for example calibration mirrors. In addition, the measurement arrangement must be kept as stable as possible over the entire measurement time (calibration measurement and measurement of the surface of the test object) in order to minimize errors due to drifts. Finally, the interferometrically measured wavefront includes rigorous effects. The latter come about due to the fact that the calculation of the structure patterns for the CGH makes the assumption that the structures lie in a common (two-dimensional) plane, while in the case of the real CGH, after the structures are produced, three-dimensional structures are present. These effects are corrected in a model-based fashion. The inaccuracy and complexity of the models for calculating the rigorous effects increases exponentially with the number of encodings on the CGH.

SUMMARY

Objects of the invention include providing a measurement method and a measurement arrangement for interferometrically measuring a shape of a surface of a test object, which operate with the aid of a diffractive optical element and enable precise measurements within short measurement times with a relatively simple optical setup of the measurement arrangement.

To achieve these objects, the invention provides a measurement method and a measurement arrangement as claimed in the independent claims. Preferred developments are specified in the dependent claims. The wording of all the claims is incorporated by reference into the description of this application by this reference.

According to one formulation, the measurement method serves for interferometrically measuring the shape of a surface of a test object, for example of an optical element for an optical system. The test object may be, for example, a plane mirror or a concavely or convexly curved mirror. A first input wave having a first wavelength $\lambda_1$ and a second input wave having a second wavelength $\lambda_2$, which differs from the first wavelength, that is to say is shorter or longer than the first wavelength, are provided for the measurement.

In other words, at least two different wavelengths are used for the measurement, which means that the measurement method is a polychromatic measurement method. A first test wave, which is directed at the test object and has a wavefront that is adapted at least partially to a desired shape of the optical surface, and a first reference wave, which is directed at a first reflective optical element and has a propagation direction that differs from the propagation direction of the first test wave, are produced from the first input wave. The first test wave and the first reference wave are produced from the first input wave by diffraction at a diffractive optical element. Analogously, a second test wave and a second reference wave are produced from the second input wave by diffraction at the same diffractive optical element. The second test wave also has a wavefront that is adapted at least partially to the desired shape of the optical surface, while the second reference wave is directed at a second reflective optical element and has a propagation direction that differs from the propagation direction of the second test wave. After interaction with the test object, the first test wave is superimposed with the first reference wave after back-reflection at the first reflective optical element. After interaction with the test object, the second test wave is superimposed in a corresponding manner with the second reference wave after back-reflection at the second reflective optical element, wherein the two test waves (first and second test waves) and the two reference waves (first and second reference waves) are diffracted again at the same diffractive optical element for superposition. The first interferograms produced by the superposition of the first test wave and the first reference wave in a first capture plane and the second interferograms produced by the superimposition of the second test wave with the second reference wave in a second capture plane are captured and then jointly evaluated while taking into account the difference between the first and the second wavelength.

A measurement arrangement suitable for carrying out the measurement method consequently has a light source that is suitable for providing the first and second input waves having the different wavelengths (first and second wavelengths). This measurement arrangement furthermore comprises the diffractive optical element that produces said test waves and reference waves from the input waves of different wavelengths. Furthermore, for each of the wavelengths, a reflective optical element is provided, which is arranged in the beam path of the respective reference wave and is designed for the back-reflection of the respective reference wave. A capture device serves for capturing first and second interferograms which are produced by wavelength-appropriate superposition of the first and the second test wave after interaction with the test object and the back-reflected first and second reference waves, in each case after a further diffraction at the diffractive optical element in a capture plane A wavelength-appropriate superposition here means that only test waves and reference waves of the same wavelength result in interferograms on which the evaluation is based. When jointly evaluating the first and second interferograms in an evaluation device, the difference between the first and the second wavelength is taken into account. That means in particular that for example terms that correspond to the difference between the wavelengths (wavelength difference $\Delta\lambda=\lambda_1-\lambda_2$) or to the wavelength ratio $\alpha=\lambda_1/\lambda_2$ or to variables derived therefrom are taken into account in the evaluation. In other words, the evaluation does not take place for each wavelength separately, but additional information which would not be accessible without the joint evaluation of the wavelengths is produced from the difference between the wavelengths.

An important advantage of the polychromatic measurement is that there is no need to carry out separate calibration measurements, for example for being able to ascertain geometric optical errors of the diffractive optical element and take them into account during the evaluation. It is thus possible to save measurement time compared to conventional methods that include separate calibration measurements. In addition, the measurement arrangements can have a simpler setup because separate devices for the calibration measurements, for example calibration mirrors, can be dispensed with.

In addition, diffractive optical elements of relatively simple construction can be used. In particular, CGHs that have been encoded five or even more times can be dispensed with because frequently the use of CGHs that have been encoded four times or CGHs that have been encoded three times is sufficient. These CGHs tend to produce fewer disturbing reflection then CGHs that have been encoded five or even more times.

Finally, it is also possible in some cases to determine the placement errors and the figure, that is to say the surface shape, simultaneously.

In preferred embodiments, the wavelength ratio $\alpha=\lambda_1/\lambda_2$, that is to say the quotient of the wavelengths used, is less than two, in particular ranging from 1.2 to 1.5, if $\lambda_1>\lambda_2$. As a result, the utilizable stripe densities of the structures on the computer-generated holograms may be neither too large nor too small and can nevertheless produce the necessary diffraction angles and diffraction intensities. The quotient or the wavelength ratio should preferably correspond approximately to an irrational number, for example approximately to the value of root 2. As a result, reflections can be suppressed even further, making it possible to improve the measurement accuracy. For the event that the total value of the wavelength ratio in front of the decimal point is a single digit (that is to say less than 10), "approximately" in this context means that the wavelength ratio matches the nearest irrational number in at least three significant figures, that is to say at least up to the second digit after the point.

In some method variants, a first measurement with the first wavelength and a second measurement with the second wavelength are carried out simultaneously. Owing to the simultaneous measurement, a particularly high level of measurement accuracy can be achieved because each wavelength passes through the same measurement arrangement at a given time point, with the result that drift effects to this extent play no role. In a corresponding measurement arrangement, a spatial separation of the reference paths may be provided. There may thus be two separate reflective optical elements, which are arranged in different downstream propagation directions with respect to the diffractive optical element.

In another embodiment, a first measurement with the first wavelength and a second measurement with the second wavelength can be carried out successively, that is to say without a temporal overlap. The measurements with the different wavelengths can be carried out several times in alternation one after the other. If there is a time lag between the measurements of the different wavelengths, a simpler measurement setup with only a single reflective optical element may be used, which serves both as the first reflective element (for back-reflection of the first reference wave) and also as the second reflective element (for back-reflection of the second reference wave). The structure dimensions for producing the first and the second reference waves at the diffractive optical element then must be adapted to one another in a manner such that the first and the second reference wave have the same propagation direction.

Preferred embodiments of the measurement arrangement are accordingly characterized in that the diffractive optical element has exactly three or exactly four different structure patterns, which are configured to produce, from the first input wave and the second input wave, the first test wave, the second test wave and also the first reference wave and the second reference wave.

Since no separate calibration is necessary, no further measurement wave, in particular no calibration wave directed at a calibration mirror, is produced in addition to the first and the second test wave and to the first and second reference wave in preferred embodiments. The measurement arrangement can then be set up such that no further reflective optical element for the back-reflection of a wave produced by the diffractive optical element to the diffractive optical element is provided in addition to the first reflective optical element and the second reflective optical element.

BRIEF DESCRIPTION OF THE DRAWINGS

Further advantages and aspects of the invention are evident from the claims and from the description of exemplary embodiments of the invention, which will be explained below with reference to the figures.

DETAILED DESCRIPTION

Figure 1:
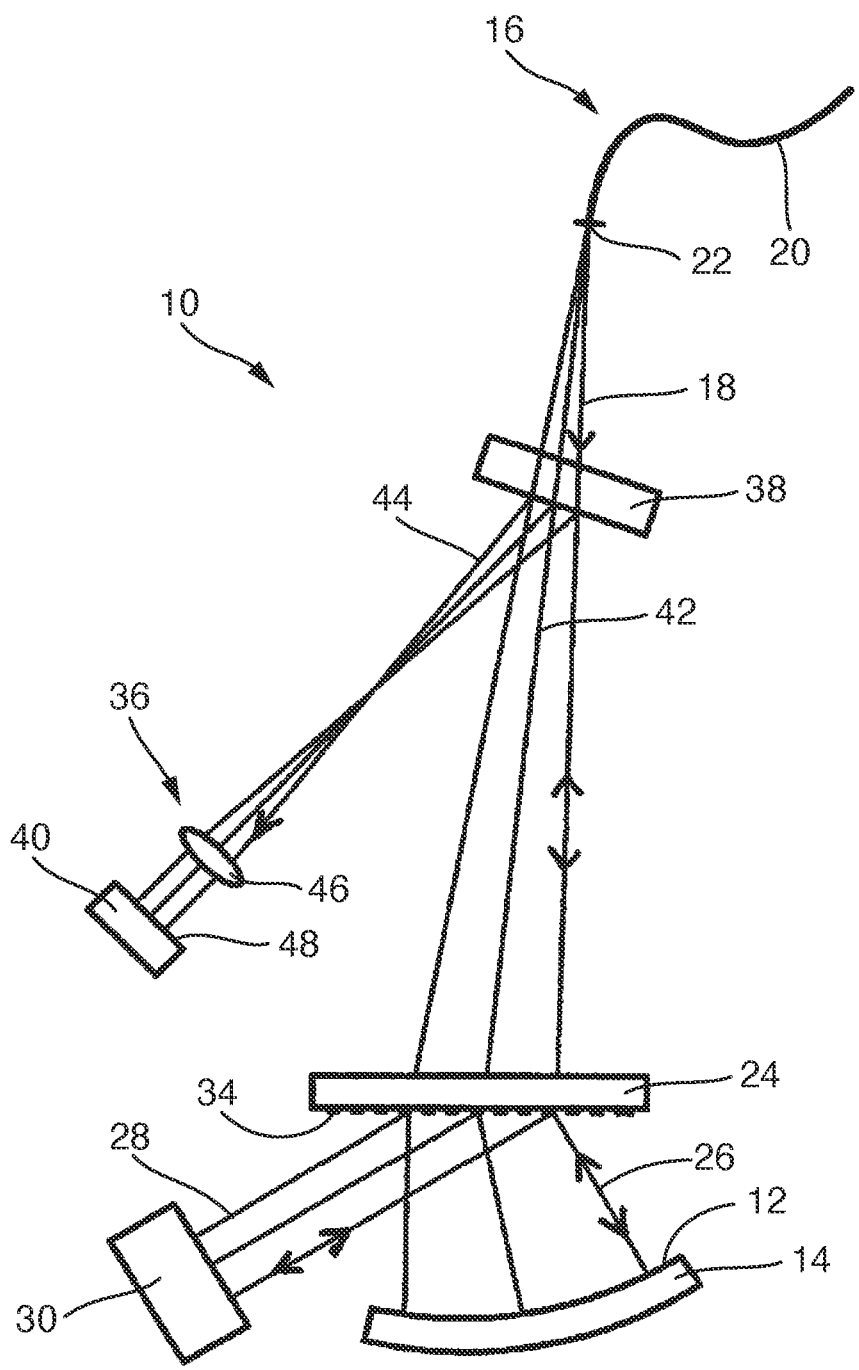
FIG. 1 shows a schematic illustration of a reference measurement arrangement of the prior art.

To facilitate comprehension of various aspects of the measurement method and of the measurement arrangement and to illustrate a few differences with respect to the prior art, FIG. 1 shows a schematic illustration of a measurement arrangement of the prior art from DE 10 2015 209 490 A1, which corresponds to US 2018/0106591 A1 and serves as a reference for the following directions.

The measurement arrangement 10 in FIG. 1 is designed for interferometrically determining the shape of an optical surface 12 of a test object 14. The measurement arrangement 10 can be used, in particular, to determine a deviation of the actual shape of the surface 12 from a desired shape. The test object 14 provided may be for example a mirror of a projection lens for EUV microlithography having a surface, designed as a free-form surface, for reflecting EUV radiation.

The measurement arrangement 10 includes a light source 16 for providing a sufficiently coherent measurement radiation as an input wave 18. In the exemplary embodiment, the light source 16 comprises an optical waveguide 20 having an exit surface 22. The optical waveguide 22 is connected to a radiation source (not illustrated), e.g., in the form of a laser. By way of example, provision to this end can be made of a helium-neon laser with a wavelength of about 633 nm. The measurement arrangement includes a diffractive optical element (DOE) 24 for producing a test wave 26 and a reference wave 28 from the input wave 18 and a reflective optical element 30 to reflect the reference wave 28. The diffractive optical element 24 is configured in the form of a complex coded CGH and includes diffractive structures 34, which form two diffractive structure patterns 34 that are arranged superposed on one another in a plane.

One of the diffractive structure patterns is configured to produce the test wave 26 with a wavefront that is adapted at least partially to the shape of the optical surface 12. The other diffractive structure pattern produces the reference wave 28 having a plane wavefront. At the diffractive structure, the test wave 26 can for example be produced in a first order of diffraction of the first structure pattern, and the reference wave 28 can be produced in a first order of diffraction of the second structure pattern.

The measurement arrangement 10 furthermore includes a capture device 36 having a beam splitter 38 for guiding the combination of the reflected test wave 26 and the reflected reference wave 28 out of the beam path of the input wave 18, and an interferometer camera 40 for capturing an interferogram produced by superposing the reference wave 28 on the test wave 26.

The illumination radiation provided by the light source 16 exits the exit face 22 of the optical waveguide 20 in the form of an input wave 18 having a spherical wavefront and propagates divergently along a propagation axis 42 that is directed at the diffractive optical element 24. In the process, the input wave 18 first passes through the beam splitter 38 and then through the diffractive optical element 24.

The diffractive optical element 24 produces in transmission, by way of diffraction at one of the diffractive structure patterns arranged superposed on one another, from the input wave 18 the test wave 26 which is directed at the surface 12 of the test object 14 and has a wavefront that is adapted to a desired shape of the surface 12. During this transformation, the wavefront is adapted such that the test wave is perpendicularly incident at each location of a surface in a desired shape and is reflected back on itself.

The test wave 26 propagates in the direction of the test object 14 and next is incident, after the production at the diffractive optical element 24, on the optical surface 12 of the test object 14. The test wave 26 is reflected by the surface 12 back to the diffractive optical element 24 and is diffracted again upon passage through the diffractive structures 34. In the process, the reflected test wave 26 is transformed back into an approximately spherical wave, wherein the wavefront thereof has, due to deviations of the surface 12 of the test object 14 from the desired shape, corresponding deviations from a spherical wavefront.

The diffractive optical element 24 furthermore produces in transmission, by way of diffraction at the other one of the diffractive structure patterns, from the input wave 18 the reference wave 28 which is directed at the reflective optical element 30. The reference wave 28 here has a propagation direction that deviates from the propagation direction of the test wave 26 and a wavefront that is adapted to the surface shape of the reflective optical element 30.

After the reference wave 28 is produced at the diffractive optical element 24, it is incident next on the reflective optical element 30 and is reflected back on itself thereby. In this case no further optical elements are situated in the beam path of the reference wave 28 or in the beam path of the test wave 26. The reflected reference wave 28 again passes through the diffractive optical element 24 and is diffracted again. In the process, the reflected reference wave 28 is transformed back into a spherical wave.

The diffractive optical element 24 therefore also serves for superposing the reflected reference wave 28 on the reflected test wave 26. Both waves are incident on the beam splitter 38 as convergent beams 44 and are reflected thereby in the direction of the interferometer camera 40. Both convergent beams 44 travel through an eyepiece 46 and are ultimately incident on a capture plane 48 of the interferometer camera 40. The interferometer camera 40 can be configured for example in the form of a CCD sensor and captures an interferogram produced by the interfering waves. Arranged in the focus of the convergent beams 44 can be a stop as a spatial filter for reducing scattered radiation.

An evaluation device (not illustrated) of the measurement arrangement 10 determines from the captured interferogram the actual shape of the optical surface 12 of the test object 14.

A calibration of the diffractive optical element can be carried out as part of the measurement. The diffractive optical element 24 can for this purpose comprise diffractive structures 34, which form more than two diffractive structure patterns arranged in superposed fashion in a plane. Such a diffractive optical element having four superposed diffractive structure patterns is disclosed for example in DE 10 2012 217 800 A1. Here, the different diffractive structure patterns are formed by individual phase functions of a complex coded phase grating. A CGH that produces two calibration waves with different propagation directions in addition to the test wave and to the reference wave is described in connection with FIG. 4 of DE 10 2015 209 490 A1. For the production of three calibration waves, a complex coded phase grating having five different phase functions, that is to say a five-times encoded diffractive optical element, is used (see DE 10 2017 217 369 A1).

The inventor has analysed advantages and limitations of these conventional procedures in detail and provides solutions that utilize the advantages of this technology but largely avoid or at least reduce the disadvantages.

The cavity of the above-described, conventional interferometer or the measurement arrangement consists of a complex coded CGH 24, a plane reference mirror 30 and the test object 14. In a phase shift method, the reference mirror 30 is moved perpendicularly to the light direction. The difference in the wavefronts between the reference mirror $R(x, y)$ and the test object $P(x, y)$ can be determined in a spatially resolved manner from the interferograms thus measured on the detector 40.

$$V(x, y) = P(x, y) - R(x, y)$$

The wavefront of the reference mirror can be determined externally. The reference mirror can for this purpose be rotated or displaced in a plane, for example. Any errors on the reference mirror can be determined in this way. The sought wavefront of the test object can thereby be found as follows.

$$P(x, y) = V(x, y) + R(x, y)$$

This applies to a setup with an ideal CGH, which has no errors. In practice, however, a CGH primarily causes two types of errors, specifically
(i) geometric optical errors, caused by incorrect positioning of the structure (placement); and
(ii) rigorous errors arising from the interaction of the light with the 3D structure, which are not taken into account in the design of the CGH (as a 2D structure).
The measured signal thus has the following shape:

$$V = (P - R) + (P_{GO} - R_{GO}) + (P_{Rig} - R_{Rig})$$

With the geometric optical errors $E_{GO}$, $R_{GO}$ and with the rigorous errors $P_{Rig}$, $R_{Rig}$.

The rigorous errors can be determined in a model-based fashion. To this end, the CGH can be measured externally. Based on these measurements, the Maxwell equations can then be solved. The solution to these calculations are the sought $P_{Rig}$, $R_{Rig}$ The placement errors can be determined for example with the aid of three reference spheres. To this end, a five-times encoded CGH can be used, which produces five waves from the input wave, specifically the reference wave, the test wave and the three spherical waves. The unknown placement error $P_{GO} - R_{GO}$ is linearly interpolated from the sphere measurements. This procedure has, among others, the following disadvantages:
(i) Five-times encoded CGHs can cause many undesirable reflections.
(ii) In the linear interpolation of the geometric optical errors, a stable cavity is assumed. Drifting of the interferometer setup can falsify the result.
(iii) The model-based rigorous errors increase exponentially with the number of encodings on the CGH. The insufficient accuracy of the Maxwell solution is limiting in EUV optical units.

Examples of solution approaches that at least reduce the disadvantages will be described below. What the solution approaches have in common is that they involve polychromatic measurement methods and measurement arrangements, which are characterized in that the measurements are carried out with (at least) two different wavelengths. Light having exactly two different wavelengths is preferably used for the measurement.

Figure 2:
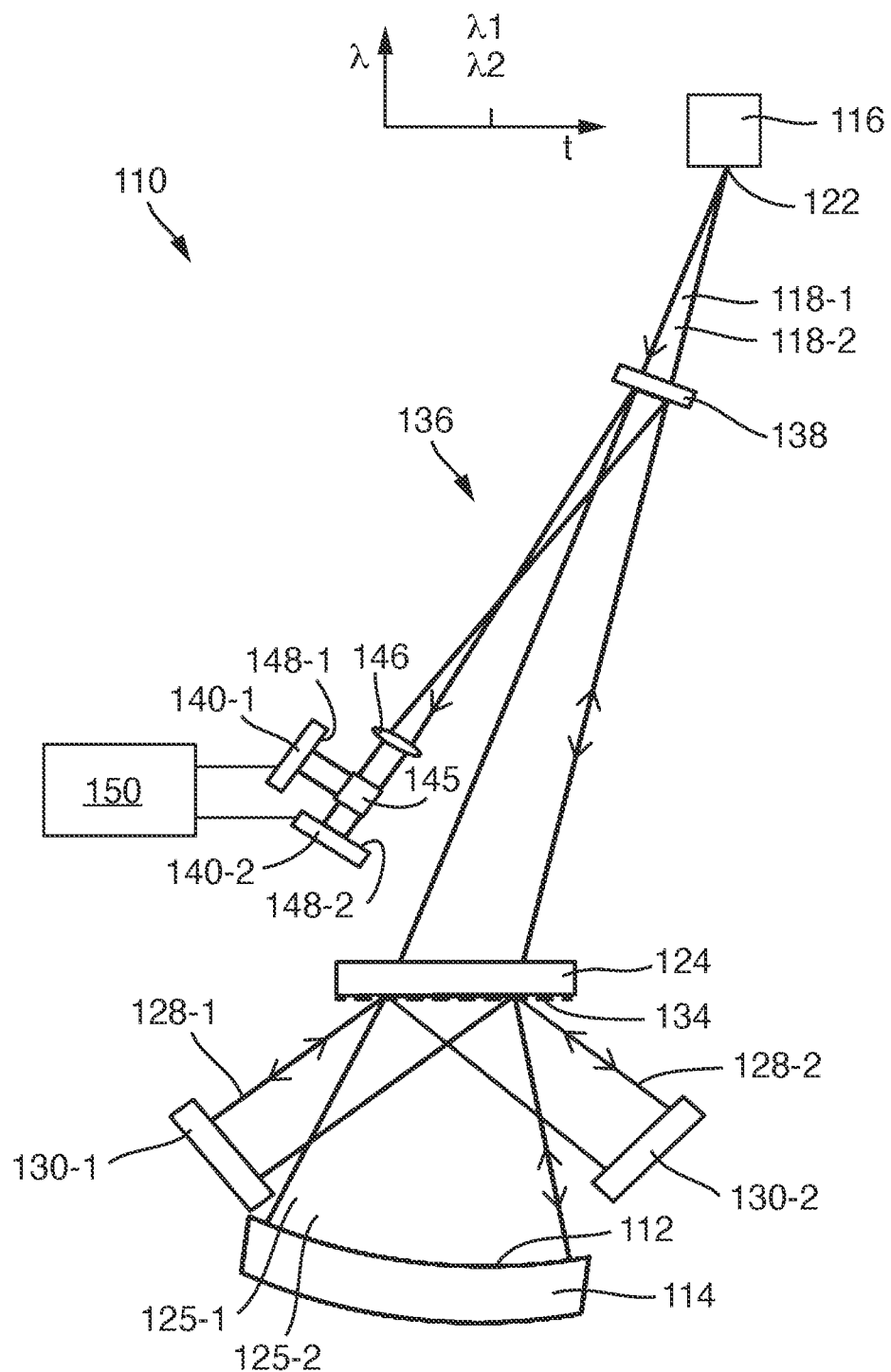
FIG. 2 shows a schematic illustration of a measurement arrangement in accordance with a first embodiment of the invention.

FIG. 2 illustrates a first exemplary embodiment of a measurement arrangement 110 for interferometrically determining the shape of an optical surface 112 of a test object 114. The test object can for example be a mirror of a projection lens for EUV microlithography, operating with EUV radiation of a wavelength of less than 100 nm, in particular a wavelength of about 13.5 nm or about 6.8 nm. The concave, non-spherical surface of the mirror can be a free-form surface with a deviation from each rotation-symmetric asphere of more than 5 μm and/or a deviation from each sphere of at least 1 mm.

The light source 116 of the measurement arrangement 110 is designed for providing sufficiently coherent measurement radiation with at least two different wavelengths, specifically a first wavelength $\lambda_1$ and a second wavelength $\lambda_2$, which differs from the first wavelength. A wavelength ratio $\alpha = \lambda_1 / \lambda_2$ can lie (for $\lambda_1 > \lambda_2$) for example in the range from 1.2 to 1.5, and possibly above or below this range.

The polychromatic light source 116 can have for example a tunable solid-state laser, which can generate laser light of different wavelengths in the visible spectrum. For example, a tunable frequency-stabilized monolithic Nd:YAG laser can be used, which is frequency-stabilized to a hyperfine structure line of molecular iodine and is internally frequency-doubled to a wavelength of 532 nm. The two wavelengths are set with a high level of accuracy, the exact frequency values can be determined for example with the aid of a frequency comb generator (measurement device for highly accurate frequency measurements) or with the aid of an atomic clock. One possibility that is usable here for generating two different wavelengths is described in the specialist article "Frequency-comb-referenced two-wavelength source for absolute distance measurements" by N. Schuhler et al. in: Optics Letter 31, Issue 21 (2006) Pages 3101-3103. The disclosure of said specialist article is incorporated in its entirety by this reference into the content of this description of the present application.

In the case of the example in FIG. 2, the light source is configured to simultaneously emit light of the two wavelengths. Proceeding from an exit surface 122 of the light source, two spatially superposed input waves of different wavelengths are generated, specifically a first input wave 118-1 having the first wavelength $\lambda_1$ and a second input wave 118-2 having the different, second wavelength $\lambda_2$.

The measurement arrangement 110 has a diffractive optical element 124 in the form of a complex coded computer-generated hologram (CGH), which, in the case of the example, operates in transmission. The diffractive optical element 124 has a substrate of high-purity fused silica on which diffractive structures 134 are formed, which form exactly four diffractive structure patterns arranged in a plane that produce, from the input waves, exactly four output waves of different properties. The structure patterns are arranged superposed in a common plane.

A first test wave 125-1 (having the first wavelength), which has a wavefront that is at least partially adapted to the desired shape of the optical surface 112, is produced from the first input wave. The second input wave is transformed into a second test wave 125-2, which likewise has a wavefront that is adapted to the desired shape of the optical surface but has a different wavelength (second wavelength). The first and the second test wave travel in the same propagation direction with respect to the test object 114.

A further diffractive structure at the diffractive optical element 124 is provided to form by diffraction from the first input wave a first reference wave 128-1, the propagation direction of which differs from the propagation direction of the first and the second test wave and which is directed in the direction of a first reflective optical element 130-1. A further diffractive structure is designed to produce by diffraction, from the second input wave, a second reference wave 128-2, which is directed at a second reflective optical element 130-2. The propagation direction of the second reference wave differs from the propagation direction of the first reference wave and the propagation direction of the test waves. In the case of the example, the reflective optical elements 130-1, 130-2 are located, with respect to the test waves, on opposite sides downstream of the diffractive optical element 124.

After the reflection at the test object 114, the first test wave travels back in the direction of the diffractive optical element 124 and is superimposed, after interaction with the test object 114, with the first reference wave after back-reflection at the first reflective optical element 130-1. The same applies to the second test wave, which is superimposed with the second reference wave after the reflection at the second reflective optical element 130-2. For superposition, the first and second test waves and the first and second reference waves are each diffracted again at the diffractive optical element and travel back together in the direction of the light source.

In the beam path between the exit surface 122 of the light source and the diffractive optical element 124, a beam splitter 138 is arranged, which can be considered to be an integral part of a capture device 136. The capture device 136 serves for capturing a first interferogram produced by the superposition of the first test wave 125-1 and the first reference wave 128-1 in a first capture plane 148-1 and a second interferogram, which is produced by the superposition of the second test wave 125-2 and the second reference wave 128-2 in a second capture plane 148-2. The capture planes in each case correspond to the photosensitive surfaces of interferometer cameras 140-1, 140-2, which can be equipped for example with CCD sensors and each capture interferograms produced by the interfering waves of the same wavelength.

The waves reflected by the beam splitter 138 to this end initially travel through a chromatically corrected optical system 146, which collimates the waves of both wavelengths without producing practically relevant chromatic aberrations and guides them in the direction of a wavelength-selective beam splitter 145, which reflects the superposed waves of the first wavelength to the first interferometer camera 140-1, while the superposed waves of the second wavelength are transmitted to the second interferometer camera 140-2.

By phase shifting the two reference mirrors 130-1, 130-2, it is possible with this setup to determine the phase difference between the test object and the two reference mirrors for two wavelengths.

The interferograms are evaluated in an evaluation device 150 connected to the interferometer cameras. In this case, a joint evaluation takes place taking into account the wavelength difference or the two different wavelengths. That means in particular that terms that correspond to the difference between the wavelengths ($\lambda_1-\lambda_2$) or to the wavelength ratio ($\lambda_1/\lambda_2$) or to variables derived therefrom are taken into account in the evaluation. On the basis of the interferograms captured for at least two different wavelengths, the evaluation device 150 determines the actual shape of the optical surface 112 of the test object 114.

The evaluation uses, among other things, the fact that the placement errors of the CGH scale linearly with the wavelength according to $$P_{GO}(\lambda)-R_{GO}(\lambda)=const\times\lambda$$

but the phase information of the test object for the wavelength used is identical with $P(\lambda_1)-R(\lambda_1)=P(\lambda_2)-R(\lambda_2)$.

From the two measurements with $\lambda_1$ and $\lambda_2$, both the unknowns const and PR can be determined with $$P-R = \frac{\lambda_1 V(\lambda_2) - \lambda_2 V(\lambda_1)}{\lambda_1 - \lambda_2}$$

It is thus possible to simultaneously measure the geometric optical errors of the CGH with the aid of a four-times encoded CGH.

It is considered to be an important advantage of the polychromatic measurement that no separate calibration measurements need to be provided. Accordingly, optical components that are necessary therefor (for example calibration mirrors) can be dispensed with, and in addition the measurement time can be shortened compared to the prior art.

Figure 3:
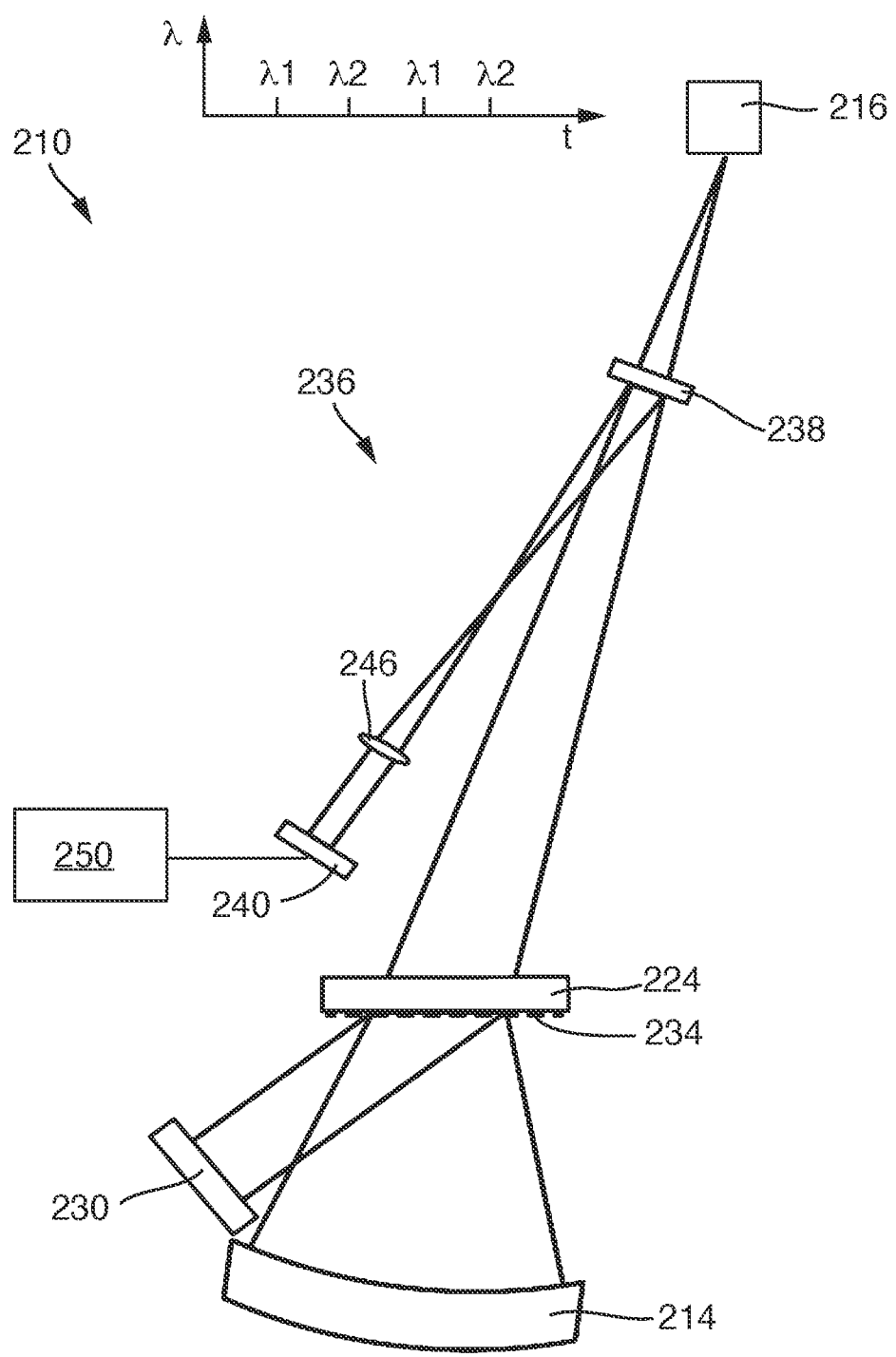
FIG. 3 shows a schematic illustration of a measurement arrangement in accordance with a second embodiment of the invention.

A second exemplary embodiment of a measurement arrangement 210, which is designed for a polychromatic measurement of the shape of optical surfaces, is described with reference to FIG. 3. In the example, a test object 214 in the form of an EUV concave mirror is measured. For clarity reasons, identical or similar or equivalent components are provided with the same reference signs as in FIG. 2, but increased by 100.

The measurement arrangement 210 permits an alternative determination of the geometric optical errors with the aid of a four-times encoded CGH. A polychromatic light source 216 which can generate at least a first and a second wavelength of the type described above is likewise used here. The light source is able to emit the two wavelengths in each case one after the other in terms of time (that is to say without any temporal overlap), preferably in quick succession in multiple alternations (see diagram λ(t)). It is possible to switch between the two wavelengths for example in second-long cycles, which here means that the individual measurement times per wavelength lie in the order of magnitude of one or a few seconds.

Differences with respect to the measurement arrangement of FIG. 2 consist, among other things, of the fact that the structure of the diffractive optical element 224 is different than in the prior exemplary embodiment. Furthermore, the measurement arrangement 210 needs only a single reference mirror 230, which acts as a first reference mirror (for the first wavelength) and as a second reference mirror (for the second wavelength). Furthermore, it is possible to operate with only one interferometer camera 240, which is connected to the evaluation device 250 and is sufficiently sensitive for both wavelengths. In comparison with the first embodiment, a second interferometer camera and the beam splitter upstream of the interferometer camera can thus be dispensed with.

Exactly as in the previous exemplary embodiment, a four-times encoded CGH is used. The diffractive structures 234 for the two test waves can correspond to the corresponding diffractive structures or encodings of the first exemplary embodiment (FIG. 2) or deviate therefrom. The diffractive structures for producing the two reference waves are adapted to one another in a manner such that, in both cases, that is to say for the first wavelength and for the second wavelength, the order of diffraction with the greatest intensity travels in the same propagation direction, with the result that both wavelengths can use the same refractive and optical element 230 for reflecting the reference waves back on themselves. Accordingly, the diffractive structures have for the different wavelengths different line spacings to achieve the same diffraction into the same spatial direction.

The measurement arrangement or the interferometer is temporally successively irradiated with the two wavelengths from the light source 216. The light is collimated in each case after passing through the corresponding cavity at the beam splitter 238 of the capture device 236 by the chromatically corrected optical unit 246. The interferometer camera 240 records the interferograms. If phase shifting is used in the measurement, the reference mirror is moved parallel to the propagation direction of the reference wave after a measurement with a first phase. Then, one after another, a measurement with the first wavelength and then a measurement with the second wavelength (or vice versa) is carried out. The steps are repeated until the desired number of interferograms at different phase positions is captured.

The light source 216 is designed such that it is possible to quickly (for example in second-long cycles) switch between the two wavelengths (see λ(t) diagram). For this reason, the measurements with the different wavelengths substantially "see" the same state of the measurement arrangement, meaning that drift-related measurement errors are generally negligible. In comparison with the first exemplary embodiment, the evaluation does not change. In this case, too, it is possible to determine from the two measurements with $\lambda_1$ and $\lambda_2$ the two unknowns const and P–R with:

$$P - R = \frac{\lambda_1 V(\lambda_2) - \lambda_2 V(\lambda_1)}{\lambda_1 - \lambda_2}$$

Figure 4:
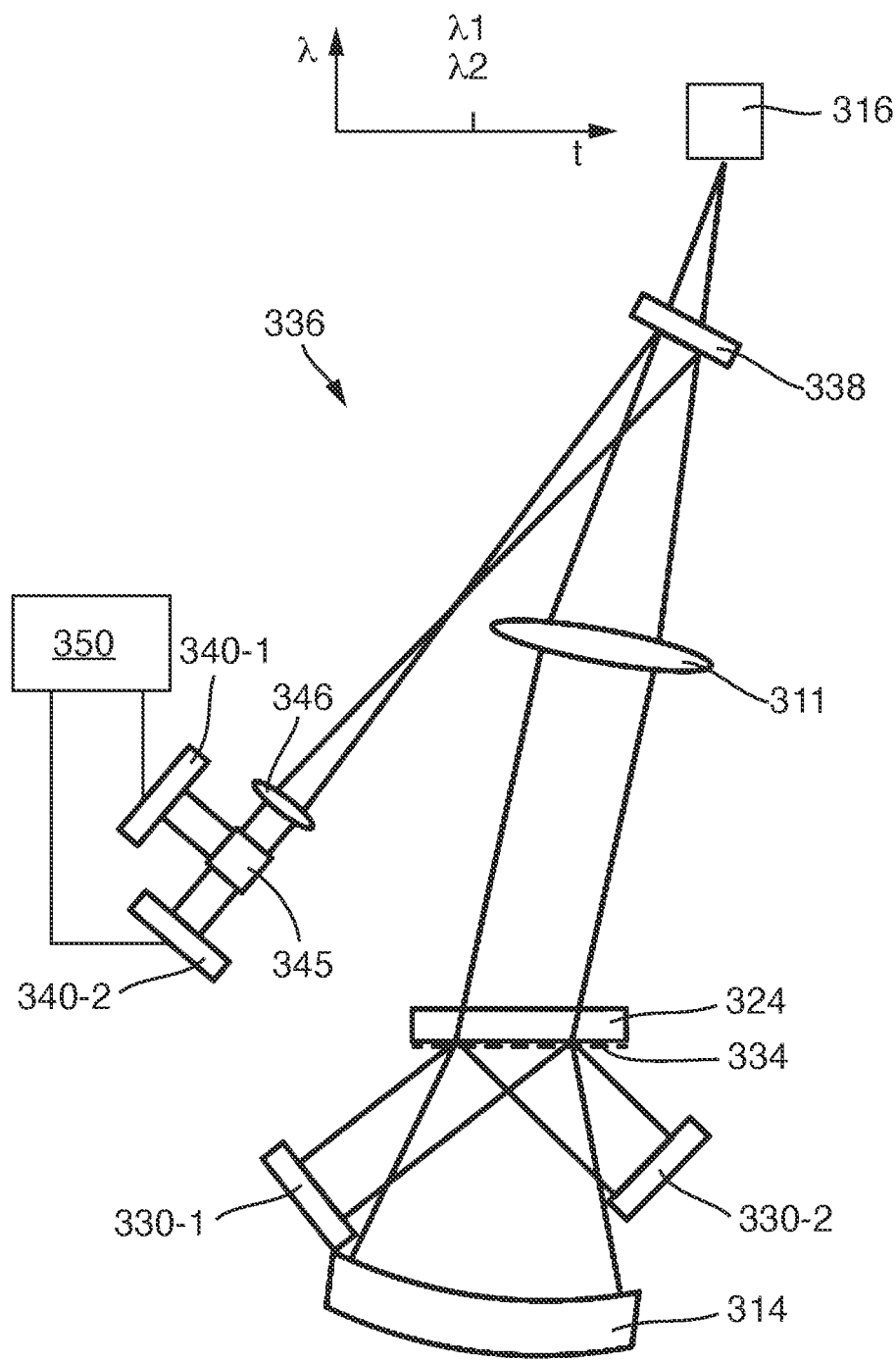
FIG. 4 shows a schematic illustration of a measurement arrangement in accordance with a third embodiment of the invention.

With reference to FIG. 4, a third exemplary embodiment of a measurement arrangement 310 will now be explained, which is designed to measure, among other things, measurements of the placement errors with a merely three-times encoded CGH. The measurement set up is similar to that of the first exemplary embodiment in FIG. 2, which is why the same reference signs, increased by 200, are used for the same or corresponding or equivalent components.

Differences to that exemplary embodiment are related to the illumination beam path for the diffractive optical element 324 and, in addition, to the diffractive structures 334 of the diffractive optical element 324, which is a merely three-times encoded computer-generated hologram. The capture device 336 having a collimation optical unit 346, a beam splitter 345 and the interferometer cameras 340-1, 340-2, which are connected to the evaluation device 350, can correspond to that of FIG. 2.

In order to achieve that the diffractive optical element 324 is irradiated in a collimated manner with input waves of two different wavelengths, a chromatically corrected collimation optical unit 311 is inserted in the beam path between the light source 316 and the diffractive optical element 324. This is because, if the diffractive optical element 324 is illuminated in a collimated manner, the number of encodings can be reduced as required to merely three.

A first encoding produces the first test wave (test wave for the first wavelength), the second encoding produces the second test wave (test wave for the second wavelength). The third encoding corresponds to a linear grating, which produces a plane reference wave for all wavelengths. Shorter wavelengths are here diffracted less strongly than longer wavelengths. The first reference mirror 330-1 (reflective optical element 330-1) for the back-reflection of the reference wave with the first wavelength and the second reference mirror 330-2 are oriented at different angles with respect to the diffractive optical element 324 according to the law of diffraction, such that the first and the second reference wave are each incident perpendicularly on the associated first or second reference mirror. For example, it is possible to use the first and the minus first order of diffraction of the radiation diffracted at the linear grating. Both form a plane wave in each case. In this case, the two plane reference mirrors can be located on different sides of the diffractive optical element, that is to say on different sides of the beam path extending between the diffractive optical element 324 and the test object 314. In comparison with the first suggestion, the measurement and the evaluation do not change. Here, too, the measurement is carried out simultaneously with both wavelengths, and the two unknowns const and P–R can be determined from the measurements according to the above equation.

A few advantages of this novel approach can be combined as follows. The frequency or the wavelength of measurement radiation is associated with the variables that can be measured best (for example with measurement accuracies up into the range of $1*10^{-13}$ or $1*10^{-14}$). Therefore, it can be assumed in the evaluation according to the above-mentioned equation that the measurement uncertainty in the denominator (wavelength difference $\lambda_1-\lambda_2$) is negligibly small. The measurement arrangement brings about relatively few disturbing reflections, because four-times encoded CGHs or three-times encoded CGHs can, depending on the principle, bring about fewer disturbing reflections than CGHs with five or even more encodings. The simultaneous measurement ensures that the measured state of the test object during the measurement time is identical for the two measurement signals (that is to say for both wavelengths). Any drift effects thus do not negatively affect the ratio of the results of the two wavelengths. In comparison with conventional measurements, which also carry out calibration measurements in addition to the measurements on the test object, the duration of the measurement can reduce by at least a factor 4. The reduced number of the encodings on the CGH also reduces the complexity and the inaccuracy in the calculation of the Maxwell equations, which means that more precise measurement results are also made possible in this respect.

The reflectivity of the reference mirrors should be adapted such that the interference contrasts for the respective wavelengths are maximum. As mentioned, the optical system of the capture device (e.g. 246), which collimates the waves to be measured before they are captured, should be chromatically corrected, that is to say produce or have no chromatic aberrations. In the case of the exemplary embodiment of FIG. 4, this should also apply to the collimation optical unit 311 in the beam path between the light source and the diffractive optical element. Chromatic aberrations can be avoided for example by using mirror optical units for this purpose.

What is claimed is:

1. Measurement method for interferometrically measuring a shape of an optical surface of a test object, comprising:
    providing a first input wave having a first wavelength $\lambda_1$ and a second input wave having a second wavelength $\lambda_2$, which differs from the first wavelength $\lambda_1$;
    producing a first test wave, which is directed at the test object and has a wavefront that is adapted at least partially to a desired shape of the optical surface, and a first reference wave, which is directed at a first reflective optical element and has a propagation direction that deviates from a propagation direction of the first test wave, from the first input wave by diffraction at a diffractive optical element,
    producing a second test wave, which is directed at the test object and has a wavefront that is adapted at least partially to the desired shape of the optical surface, and a second reference wave, which is directed at a second reflective optical element and has a propagation direction that deviates from a propagation direction of the second test wave, from the second input wave by diffraction at the diffractive optical element,
    superimposing the first test wave, after interaction with the test object, with the first reference wave after back-reflection at the first reflective optical element and superimposing the second test wave, after interaction with the test object, with the second reference wave after back-reflection at the second reflective optical element, wherein the first and the second test waves and the first and the second reference waves are diffracted again in each case at the diffractive optical element for superposition;
    capturing a first interferogram produced by the superposition of the first test wave and the first reference wave in a first capture plane and a second interferogram, produced by the superposition of the second test wave and the second reference wave in a second capture plane; and
    jointly evaluating the first and the second interferograms taking into account a difference between the first wavelength and the second wavelength.

2. Measurement method according to claim 1, wherein a wavelength ratio $\alpha=\lambda_1/\lambda_2$ between the first wavelength and the second wavelength complies with $1.2 \leq \alpha \leq 1.5$ and/or the wavelength ratio $\alpha=\lambda_1/\lambda_2$ between the first wavelength and the second wavelength approximates an irrational number.

3. Measurement method according to claim 1, wherein terms that correspond to the difference between the wavelengths $(\lambda_1-\lambda_2)$ or to the wavelength ratio $(\lambda_1/\lambda_2)$ or to variables derived therefrom are taken into account in the joint evaluation.

4. Measurement method according to claim 1, wherein a first measurement with the first wavelength and a second measurement with the second wavelength are carried out simultaneously.

5. Measurement method according to claim 1, wherein a first measurement with the first wavelength and a second measurement with the second wavelength are carried out successively.

6. Measurement method according to claim 1, wherein no further measurement wave is produced beyond the first and the second test wave and to the first and second reference wave.

7. Measurement method according to claim 6, wherein no calibration wave directed at a calibration mirror, is produced beyond the first and the second test wave and to the first and second reference wave.

8. Measurement method according to claim 1, further comprising:
    providing the diffractive optical element with exactly three or exactly four different structure patterns, which are configured to produce, from the first input wave and the second input wave, the first test wave, the second test wave, the first reference wave and the second reference wave.

9. Measurement method according to claim 1, wherein the input waves are collimated such that the diffractive optical element is irradiated in a collimated manner with the input waves of different wavelengths.

10. Measurement arrangement for interferometrically determining a shape of an optical surface of a test object, comprising:
    a light source for providing a first input wave having a first wavelength $\lambda_1$ and a second input wave having a second wavelength $\lambda_2$, which differs from the first wavelength $\lambda_1$;
    a diffractive optical element, which is arranged in a beam path of the first and the second input waves and is configured to produce by way of diffraction from the first and the second input waves for each of the wavelengths a first and a second test wave, which is directed at the test object and has a wavefront adapted at least partially to a desired shape of the optical surface, and also to produce a first and a second reference wave, which has a propagation direction that deviates from a propagation direction of the associated test wave,
    for each of the wavelengths, a reflective optical element, which is arranged in the beam path of the respective reference wave and is designed for the back-reflection of the respective reference wave;
    a capture device for capturing first and second interferograms which are produced by wavelength-appropriate superposition of the first and the second test wave after interaction with the test object and the back-reflected first and second reference waves, in each case after a further diffraction at the diffractive optical element in a capture plane; and
    an evaluation device for jointly evaluating the first and the second interferogram, taking into account a difference between the first and the second wavelengths.

11. Measurement arrangement according to claim 10, wherein the light source is configured to produce the first and the second input waves such that, for a wavelength ratio $\alpha=\lambda_1/\lambda_2$ between the first wavelength and the second wavelength, the condition $1.2 \leq \alpha \leq 1.5$ is met and/or a wavelength ratio $\alpha=\lambda_1/\lambda_2$ between the first wavelength and the second wavelength is approximately an irrational number.

12. Measurement arrangement according to claim 10, wherein the evaluation device is configured to take into account in the joint evaluation, terms that correspond to the difference between the wavelengths $(\lambda_1-\lambda_2)$ or to the wavelength ratio $(\lambda_1/\lambda_2)$ or to variables derived therefrom.

13. Measurement arrangement according to claim 10, wherein the light source is configured to generate the first input wave and the second input wave simultaneously and/or wherein the reflective optical element is configured as a plurality of separate reflective optical elements for the back-reflection of the respective reference wave is provided, wherein the separate reflective optical elements are arranged in different propagation directions with respect to the diffractive optical element.

14. Measurement arrangement according to claim 10, wherein the light source is configured to generate the first input wave and the second input wave one after another, and/or wherein onlythe reflective optical element is configured as a single reference mirror, which serves as a first reflective element for the back-reflection of the first reference wave and as a second reflective element for the back-reflection of the second reference wave, wherein structure dimensions at the diffractive optical element are adapted to one another for producing the first and the second reference waves such that the first and the second reference waves have the same propagation direction.

15. Measurement arrangement according to claim 10, further comprising a chromatically corrected collimation optical unit inserted in the beam path between the light source and the diffractive optical element, such that the diffractive optical element is illuminated with collimated light.

16. Measurement arrangement according to claim 10, wherein the diffractive optical element has exactly three or exactly four different structure patterns, which are configured to produce, from the first input wave and the second input wave, the first test wave, the second test wave, the first reference wave and the second reference wave.

17. Measurement arrangement according to claim 10, wherein the measurement arrangement has no further reflective optical element for the back-reflection of a wave produced by the diffractive optical element to the diffractive optical element beyond the first reflective optical element and the second reflective optical element.

18. Measurement arrangement according to claim 17, wherein the measurement arrangement has no calibration mirror for the back-reflection of a wave produced by the diffractive optical element to the diffractive optical element beyond the first reflective optical element and the second reflective optical element.

* * * * *

UNITED STATES PATENT AND TRADEMARK OFFICE
CERTIFICATE OF CORRECTION

PATENT NO. : 11,879,721 B2
APPLICATION NO. : 17/701012
DATED : January 23, 2024
INVENTOR(S) : Wolf Page 1 of 1

It is certified that error appears in the above-identified patent and that said Letters Patent is hereby corrected as shown below:

In the Specification

Column 8, Line 1, delete "$E_{GO}$," and insert -- $P_{GO}$, --.

Column 8, Line 7, delete "$R_{Rig}$" and insert -- $R_{Rig}$. --.

In the Claims

Column 13, Line 28, In Claim 1, delete "wavelength$\lambda_2$," and insert -- wavelength $\lambda_2$, --.

Column 15, Line 26, In Claim 14, delete "onlythe" and insert -- the --.

Signed and Sealed this
Twenty-third Day of April, 2024

Katherine Kelly Vidal
*Director of the United States Patent and Trademark Office*